UNITED STATES PATENT OFFICE

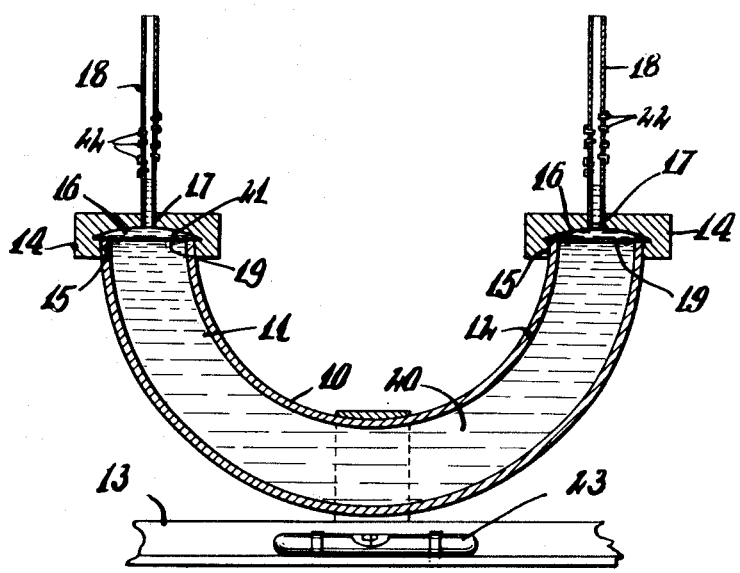
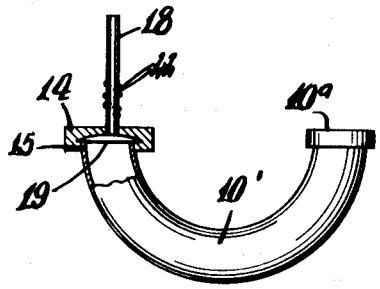
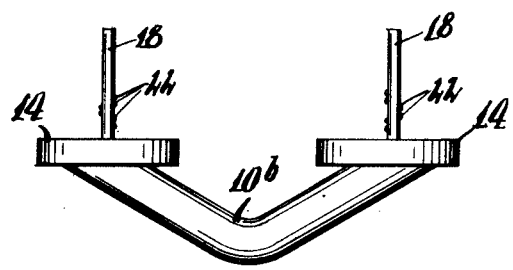
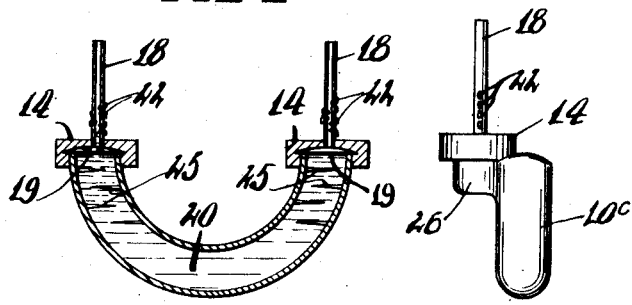

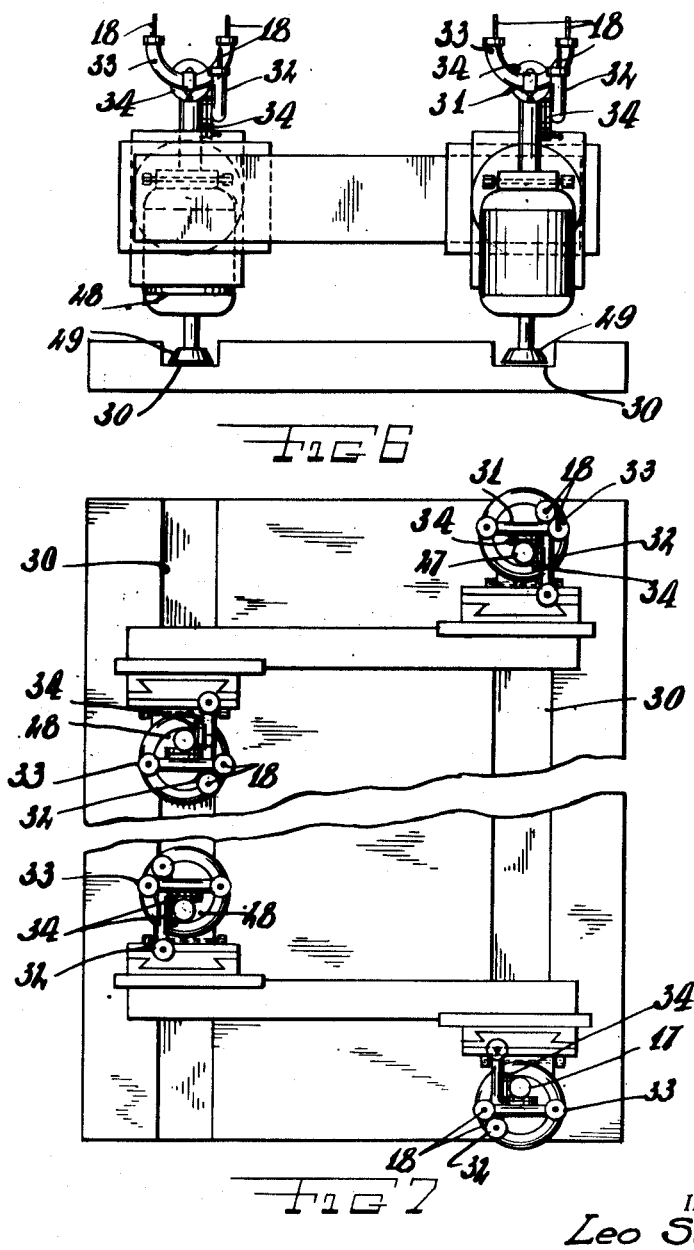

LEO SICHEL, OF ST. GEORGE, NEW YORK

FLUID ELECTRICAL CONTACT LEVEL

Application filed January 24, 1929. Serial No. 334,745.

This invention relates generally to levels and has more particular reference to a novel automatic level adjusting apparatus intended particularly to control an automatic portable grinding and milling machine such as covered in my copending application Serial No. 313,004, filed on October 17, 1928, but the same could also be advantageously used for other purposes where it is sought to automatically keep an object in a given vertical plane or to effect an electrical control by a liquid level of very great sensitivity.

The invention proposes the use of a tubular member having a pair of arms communicating with each other and filled with some liquid such as water, glycerine or the like, end caps closing the ends of the arms and each provided with a chamber separated from communication with the interior of the arm of the tubular member by a diaphragm, and a small bore tube engages in the end cap and communicates with the said chamber. A liquid adapted for conveying electrical currents is enclosed within the said chamber, and in the said small bore tube which is also provided with electrical contacts so that when said tubular member is tilted its fluid moves the diaphragm which causes the liquid in the said chamber to move the said liquid in the small tube to make or break circuits connected with the contacts, said circuits controlling the readjustment of an object to a preadjusted position in the plane of an object.

An underlying principle of the invention is the well known fact that a fluid in a U or in another similarly shaped tube will always seek a certain level even if the tube be tilted and furthermore the well known fact that a movement imparted to a flexible diaphragm on one side of a chamber filled with a fluid, to whose other side a small bore tube is connected, said fluid will move in magnified amounts in the small tube in approximately the ratio of the sectional areas of the diaphragm and the said small bore tube.

These two features have been combined for the purpose of making or breaking electrical circuits within the small bore tube in order to govern the operation of an electrical motor arranged to readjust an object to a preadjusted position within a vertical plane. It is pointed out that the slightest move of the tubular member will cause a magnified corresponding move of the fluid in the small bore tube and this provides a sensitive control of the device.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a sectional view of a device constructed according to this invention.

Fig. 2 is a side elevational view of a modified form of the device, a portion thereof being broken away to disclose interior parts.

Fig. 3 is a side elevational view of a device constructed according to a further modified form of the invention.

Fig. 4 is a view similar to Fig. 1 but disclosing another embodiment thereof.

Fig. 5 is an end elevational view of a device constructed according to another modified form of this invention.

Fig. 6 is a schematic elevational view of a duplex grinding head provided with the fluid electrical contact level.

Fig. 7 is a plan view of the same.

The reference numeral 10 indicates generally a U shaped tubular member having a pair of arms communicating with each other. The U shaped tubular member is mounted upon a base 13.

On each of the free ends of the arms of the U shaped member, an end cap 14 is engaged. This end cap is provided with a large bottom aperture 15 for receiving the free end of the arms of U shaped tubular member a chamber 16 having a concave top side and a small aperture 17 in which a small bore tube 18 is engaged. The tube 18 communicates with the chamber 16. A diaphragm 19 of rubber or thin sheet metal engages within the end cap and separates the chamber 16 from the interior of the tubular member 10.

A liquid such as glycerine, water or other suitable fluid is contained within the tubular member and indicated by reference numeral 20. A liquid indicated by reference numeral 21, having good electrical conductive qualities is engaged within the chamber 16 and the bottom portion of the small tube 18. A plurality of electrical contacts 22 are secured upon the inner side of the small tube 18 and are intended for connection in electrical circuits for cutting out or adding electrical resistance within an electric motor circuit, these causing gradual acceleration or deceleration of the electrical motor according to the connecting of the contacts by the liquid 21.

It is pointed out that the transverse cross sectional area of the U shaped member 10 is quite large relative to the cross sectional area of the tube 18. A slight tilting of the member 10 moves the diaphragm 19 very slightly by reason of the liquid 20, and the slightest movement of the diaphragm is communicated with the liquid 21 in the chamber 16 for acting upon the electrical contacts 22. This device is quite sensitive to the slightest tilting of the U shaped member since a magnification of the motion is produced determined by the relative areas of tubular member and tube 18.

A spirit level 23 is secured upon the base 13 and used for exact synchronization to level or calibration of the electrical contact level by which is meant that the electric contact level can be so set on its common base with the spirit level that the fluid in one arm of the U shaped member exerts a desired pressure upon a diaphragm 19 when the bubble of the sensitive spirit level 23 is in a certain position such as central position.

The operation of the device is as follows: The fluid electrical contact level is adjusted to level by, for instance, the sensitive spirit level 23 and kept thus with respect to the milling or grinding spindle head or any other object, it is desired to keep in a given position in a vertical plane by automatic electrically operated adjustments.

If now this grinding head to which the fluid electrical contact level is fitted is tilted at an angle to this plane the contact level will likewise be tilted. A certain amount of tilt will have a certain desired effect on the electrical contact level, the fluid in one arm rising with respect to the diaphragm member and thru this rise the fluid pressing against the diaphragm 19. This pressure on the diaphragm translates itself into a movement of the diaphragm and fluid within the chamber 21 which fluid will rise in the tube 18 with a movement magnified in the ratio of the squares of the respective diameters of the diaphragm and the tube 18. A small movement of the diaphragm caused by the rising fluid in tubular member 10 is thus made by magnification to produce relatively very considerable movement of the fluid in the small bore tube 18. The rise of the fluid in tube 18 is made use of to establish an electrical circuit through the contacts 22.

As the grinding head gradually regains its original position within the plane, the contact level has likewise regained the true level position, the pressure on the diaphragm 19 has ceased or is diminished and the fluid in the small tube 18 has reentered the chamber 21 thus laying bare contact points 22 and interrupting the electrical circuit.

The amount of the magnification before mentioned can be provided for any desired purpose by suitably proportioning the sectional areas of the chamber 21 and the small bore tube 18. The sensitivity of the apparatus or its response with regard to a given angle of tilt can be increased by giving the effective arm of the U shaped member 10 but a slight inclination from the horizontal as shown in Fig. 3. The apparatus may be used to either make or break contact for positive operation for setting in motion the electrical motor depending on whether the apparatus is set originally for contact or no contact in other words whether the same is set on increasing or decreasing pressure in the tubular member 10 with respect to the diaphragm 19 which in turn would depend on the system of electrical relay or switch system employed for the control of the motor.

The apparatus is so constructed that both arms of the member 10 become effective by fitting a diaphragm, chamber and small tube at each end of the tubular vessel as shown in Fig. 1 so that one apparatus can control one plane in two directions instead of one as would be true of the apparatus shown in Fig. 2.

The modified form illustrated in Fig. 2 shows the U shaped tubular member 10' provided with an open end indicated by reference numeral 10$^a$ and an end cap 14 engaged upon the other end. A diaphragm 19 is supported by the end cap against this end of the tubular member and a small diameter bore tube 18 engages within the end cap, these parts being arranged as before described relative to Fig. 1.

In the modified form of the device illustrated in Fig. 3 a V shaped tubular member 10$^b$ has been illustrated. In other respects the device is similar to that illustrated in Fig. 1, that is both ends of the V shaped member are provided with end caps and small bore tubes.

In order to minimize oscillations of the fluid 20 during the reciprocating motion of a portable milling machine or grinding machine to which the level is attached, on a machine bed or other casting in process of finishing, transverse baffle plates 25 can be incorporated inside of the U shaped tube for damping the oscillation and minimizing their effect upon the diaphragms of the device. These baffle plates extend from opposite sides of the tubular member forming the U shaped member of the device and alternately straddle each other so that the liquid may freely pass along the inside of the tubular member but at the same time oscillations thereof are greatly diminished. This form of the device has been illustrated in Fig. 4.

In Fig. 5 another device has been illustrated which is also constructed to dampen oscillations of the fluid contained with the U shaped member. The U shaped member is indicated by reference numeral 10° and each of the arms thereof have a top offset portion 26. End caps 14 are engaged on the top of the offset portions 26 and tubes 18 are engaged in these end caps which are provided with diaphragms as before described. It is pointed out that when the liquid oscillates in the U shaped member 10° such oscillations are not directly connected with the diaphragms of the device.

This form of device could also be used to advantage for compensating the weight of a heavy fluid such as mercury in chamber. If the offset portion 26 or its diaphragm is placed at a lower level than the top of the main tube, a head of fluid is available for compensating pressure.

In order to compensate for "lag" due to acceleration which will be particularly noticeable on the fluid contact levels governing the longitudinal vertical plane, four single tubes may be used to control this plane of which one pair would be effective during one stroke and the other pair during the return stroke of the reciprocating motion of the milling or grinding machine. These tubes would be so set for operation with respect to their effective pressure on the diaphragm that a compensation for lag of fluid due to acceleration is created and any space between the diaphram and the fluid must be taken care of by a valve or similar contrivance in order to prevent a disturbing vacuum.

In Figs 6 and 7 a pair of spindle heads 27 and 28 have been illustrated from which grinding wheels 29 project and engage in ways 30. Fluid electrical control levels 31 have been shown attached upon the spindle heads for controlling the mechanism which levels the said spindle heads. Each of the fluid electrical control levels 31 consist of a longitudinal level indicated by reference numeral 32 and a transverse level indicated by numeral 33, both fixed to swivels 34 allowing of setting the head at any angle from the vertical to the horizontal with respect to the levels. These levels may be of any of the types illustrated in Figs. 1 to 5 inclusive. Whenever the grinding heads are tilted in either of the planes of the levels one of the fluid levels will operate substantially as before described and by its connection to an electrical motor in circuit will readjust the grinding head to its preadjusted plane and this entirely automatically as governed by the setting for operation of the fluid contact levels.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A fluid electrical contact level, comprising a fluid filled tubular member having communicating arms, a diaphragm closing one of the arms, an end cap engaged on the said arm and supporting the diaphragm and formed with a fluid filled chamber communicating with the free side of the diaphragm, and a small bore tube connecting with the chamber and provided with internal contacts for connection with electrical circuits controlling the readjustment of an object to a preadjusted position in a vertical plane so that when said tubular member is tilted its fluid moves the diaphragm which causes the liquid in the said chamber to move thru the said small bore tube to make or break the electrical circuits connected with the contacts.

2. A fluid electrical contact level, comprising a fluid filled U shaped tubular member having communicating arms, a diaphragm closing one of the arms, an end cap engaged on the said arm and supporting the diaphragm and formed with a fluid filled chamber communicating with the free side of the diaphragm, and a small bore tube connecting with the chamber and provided with internal contacts for connection with electrical circuits controlling the readjustment of an object to a preadjusted position in a vertical plane so that when said tubular member is tilted its fluid moves the diaphragm which causes the liquid in the said chamber to move thru the said small bore tube to make or break the electrical circuits connected with the contacts.

3. A device of the class described, comprising a fluid filled tubular member having communicating arms, an end cap engaged on each of the arms and formed with a chamber, a diaphragm fixed in each of the end caps and separating the said chambers from the ends of the tubular member, small bore tubes relative to the diameter of the tubular member, engaged in the end caps and communicating with the said chambers, an electrical conductive liquid in each of the said chambers and small bore tubes, and electrical contacts fixed on the inner sides of the tubes for connection in circuits controlling the readjustment to a preadjusted position of an object within a vertical plane so that as the tubular member is tilted its fluid moves the diaphragms which causes the liquid in the said chambers and tubes to move in a magnified ratio for making or breaking the electrical circuits connected with the contacts.

4. A device of the class described, comprising a fluid filled tubular member having communicating arms, an end cap engaged on each of the arms and formed with a chamber having a concaved top, a diaphragm fixed in each of the end caps and separating the said chambers from the ends of the tubular member, small bore tubes relative to the diameter of the tubular member, engaged in the end caps and communicating with the said chambers, an electrical conductive liquid in each of the said chambers and tubes, and a plurality of electrical contacts fixed on the inner sides of the tubes for connection in electrical circuits controlling the readjustment to a preadjusted position within a vertical plane of an object so that as the tubular member is tilted its fluid moves the diaphragms which causes the liquid in the said chambers and tubes to move in a magnified ratio for making or breaking the electrical circuits connected with the contacts.

5. A device of the class described, comprising a fluid filled tubular member having communicating arms, baffle plates fixed on the inner sides of the tubular member for damping oscillations of the fluid, an end cap engaged on each of the arms and formed with a chamber, a diaphragm fixed in each of the end caps and separating the said chambers from the ends of the tubular member, small bore tubes relative to the diameter of the tubular member, engaged in the end caps and communicating with the said chambers, an electrical conductive liquid in each of the said chambers and tubes, and a plurality of electrical contacts fixed on the inner sides of the tubes for connection in circuits controlling the leveling readjustment to a preadjusted position within the vertical plane of an object so that as the tubular member is tilted its fluid moves the diaphragms which causes the liquid in the said chambers and tubes to move in a magnified ratio for making or breaking the circuits connected with the electrical contacts.

6. A device of the class described, comprising a fluid filled tubular member having communicating arms with offset end portions, an end cap engaged on each of the offset portions and formed with a chamber, a diaphragm fixed in each of the end caps and separating the said chambers from the ends of the tubular member, small bore tubes relative to the diameter of the tubular member, engaged in the end caps and communicating with the said chambers, an electrical conductive liquid in each of the said chambers and tubes, and electrical contacts fixed on the inner sides of the tubes for connection in circuits controlling the readjustment to a preadjusted position within a vertical plane of an object so that as the tubular member is tilted its fluid moves the diaphragms which causes the liquid in the said chambers and tubes to move in a magnified ratio for making or breaking the electrical circuits connected with the contacts.

7. A tubular vessel having communicating arms at an angle to each other, filled with a suitable liquid or semi-liquid, an end cap engaged on one or both arms, said end caps forming a shallow chamber closed by a diaphragm on one side and having a small bore tube on the other side, the diaphragm separating the said chamber from the tubular vessel, a liquid having good electrical conductive qualities inserted in the said chamber and part of small bore tube, electrical contacts in the said small bore tube for the purpose that an alteration of pressure on the diaphragm or diaphragms will cause the liquid in the chamber and small bore tube to move, thus either making or breaking electrical circuits thru the contacts in the said tube, for the purpose of governing electrical devices.

In testimony whereof I have affixed my signature.

LEO SICHEL.